United States Patent
Selby

(10) Patent No.: US 7,292,283 B2
(45) Date of Patent: Nov. 6, 2007

(54) APPARATUS AND METHOD FOR PERFORMING SUB-PIXEL VECTOR ESTIMATIONS USING QUADRATIC APPROXIMATIONS

(75) Inventor: Steve Selby, Scarborough (CA)

(73) Assignee: Genesis Microchip Inc., Santa Clara, CA (US)

( * ) Notice: Subject to any disclaimer, the term of this patent is extended or adjusted under 35 U.S.C. 154(b) by 568 days.

(21) Appl. No.: 10/990,451

(22) Filed: Nov. 16, 2004

(65) Prior Publication Data

US 2005/0135488 A1    Jun. 23, 2005

Related U.S. Application Data

(60) Provisional application No. 60/532,495, filed on Dec. 23, 2003.

(51) Int. Cl.
*H04N 7/01*    (2006.01)
*H04N 7/30*    (2006.01)

(52) U.S. Cl. ............ 348/441; 348/452; 348/699; 348/413.1; 382/236; 382/299; 375/240.17

(58) Field of Classification Search ......... 348/441, 348/445, 451, 452, 699, 700, 701, 910, 620, 348/413.1, 415.1, 431.1; 382/236, 299, 300; 375/240.17, 240.12, 240.16
See application file for complete search history.

(56) References Cited

U.S. PATENT DOCUMENTS

| | | | | |
|---|---|---|---|---|
| 4,838,685 A | * | 6/1989 | Martinez et al. | 352/85 |
| 4,873,573 A | * | 10/1989 | Thomas et al. | 375/240.16 |
| 5,652,629 A | | 7/1997 | Gonzales et al. | |
| 5,768,438 A | * | 6/1998 | Etoh | 382/251 |
| 5,784,114 A | * | 7/1998 | Borer et al. | 348/452 |
| 5,929,913 A | * | 7/1999 | Etoh | 375/240.11 |

(Continued)

FOREIGN PATENT DOCUMENTS

GB    2303513 A    *    2/1997

(Continued)

OTHER PUBLICATIONS

Argyriou et al, "*Using Gradient Correlation for Sub-Pixel Motion Estimation of Video Sequences*", IEEE International Conference on Acoustics, Speech, and Signal Processing, May 2004, pp. 329-332.

(Continued)

*Primary Examiner*—David Ometz
*Assistant Examiner*—Jean W. Désir
(74) *Attorney, Agent, or Firm*—Beyer Weaver LLP

(57) ABSTRACT

To achieve the foregoing, and in accordance with the purpose of the present invention, an apparatus and method for generating refined sub-pixel vectors for motion estimation from vector correlation values and converged vector correlation values using quadratic approximations respectively is disclosed. The apparatus and method includes defining a minimum vector position value of a converged vector and then determining a predetermined number of vector correlation samples around the minimum vector position value. The predetermined number of vector correlation samples provide a coarse correlation surface estimation of the minimum vector position value. A correlation surface fitting of the predetermined number of vector correlation samples using a quadratic approximation of the coarse correlation surface estimation of the minimum value is then performed. The correlation surface fitting resulting in a refined sub-pixel minimum vector position with horizontal and vertical components.

10 Claims, 3 Drawing Sheets

U.S. PATENT DOCUMENTS

| | | | |
|---|---|---|---|
| 6,040,864 A * | 3/2000 | Etoh | 375/240.16 |
| 6,192,080 B1 * | 2/2001 | Sun et al. | 375/240.16 |
| 6,414,997 B1 * | 7/2002 | Piccinelli et al. | 375/240.17 |
| 6,424,372 B1 * | 7/2002 | Kaneda et al. | 348/207.99 |
| 6,628,845 B1 * | 9/2003 | Stone et al. | 382/294 |
| 6,633,612 B2 * | 10/2003 | Selby | 375/240.16 |
| 6,738,423 B1 * | 5/2004 | Lainema et al. | 375/240.03 |
| 6,784,942 B2 * | 8/2004 | Selby et al. | 348/452 |
| 7,098,958 B2 * | 8/2006 | Wredenhagen et al. | 348/452 |
| 7,194,126 B2 * | 3/2007 | Konolige | 382/154 |
| 7,248,741 B2 * | 7/2007 | Akimoto et al. | 382/236 |

FOREIGN PATENT DOCUMENTS

| WO | WO 9401830 A1 * | 1/1994 |
|---|---|---|

OTHER PUBLICATIONS

Kauff et al., *"Fast Motion Estimation for Real-Time Shape-Adaptive MPEG-4 Video Encoding"*, http://www.acm.org/sigs/sigmm/MM2000/ep/kauff, Downloaded Jul. 22, 2004, 11 pages.

Li et al., *"A Locally Quadratic Model of the Motion Estimation Error Criterion Function and its Application to Subpixel Interpolations"*, IEEE Transactions on Circuits and Systems for Video Technology, vol. 6, No. 1, Feb. 1996, pp. 118-122.

Nettle, Paul; *"WWH1: Sub-Pixel Accuracy"*, http://www.gamedev.net/reference/articles/article661.asp, Downloaded on Jul. 21, 2004, 3 pages.

* cited by examiner

APPARATUS AND METHOD FOR PERFORMING SUB-PIXEL VECTOR ESTIMATIONS USING QUADRATIC APPROXIMATIONS

RELATED APPLICATIONS

The present application claims priority from U.S. Provisional Application Ser. No. 60/532,495 entitled "Sub-Pixel Vector Estimations Using Quadratic Approximations", filed on Dec. 23, 2003, by Steve Selby, assigned to the assignee of the present invention, and incorporated by reference herein for all purposes.

FIELD OF THE INVENTION

The present invention relates generally to motion estimation, and more particularly, to an apparatus and method for generating refined sub-pixel vectors for motion estimation from vector correlation values and converged vector correlation values using quadratic approximations.

BACKGROUND OF THE INVENTION

Feature films are projected at a rate of 24 frames per second. The process of projecting 24 still pictures every second creates the illusion of continuous motion on the screen. In contrast, video formats were designed for cathode ray tube television sets, which work in a completely different manner than film projectors. Televisions create still pictures, line by line, with an electron beam that passes over a phosphor coated screen. When television was first developed, the National Television Standards Committee (NTSC) defined a standard having 480 lines of resolution. In other words, the electron beam was passed over the phosphorous screen from left to right in 480 rows, from top to bottom, of the screen. When televisions were first developed, it was not feasible for the electron beam to scan all 480 rows in a single frame. As a consequence, televisions were initially designed to perform interlacing. With interlacing, every other row is scanned in a first frame and the skipped rows are scanned in the next frame. More recently progressive scan televisions have been developed, which enable all 480 lines to be scanned in each frame. Now with high definition television or "HDTV", new resolution formats have been developed, such as SMPTE 274M-1995 (1920×1080 resolution) SMPTE 296M-1997 (1280×780 resolution), etc. Regardless of the video resolution used, the frame rate differs than that used by feature films.

Since video and film have different frame rates, a frame rate conversion must be performed before a feature film can be played on a video display. For example with the NTSC format, 30 frames or 60 fields are displayed per second. Thus if only two film frames are recorded for every five frames of video, a video copy of the movie can be created that plays at the correct speed.

With video displays, area flicker is an artifact that becomes visible if the image is not refreshed fast enough. This is particularly irritating with larger displays as the eye is more sensitive to flicker in the peripheral visual regions. To reduce flicker, the display needs to refreshed at a faster rate. A straight forward scheme for up conversion that repeats the same frame more than once is therefore useful for reducing flicker. For example, a conversion from 24 frames per second to 72 frames per second has generally been found to reduce the flicker problem. Unfortunately, the higher frame rate introduces another artifact called "motion judder" when the motion of an object is present in the film.

Motion vectoring is a technique used to alleviate motion judder. With motion vectoring, frames are constructed or predicted from a reference frame using motion vectors and a prediction error. The reference frame can be either unidirectional or bidirectional. With unidirectional motion prediction schemes, the predicted picture frame is constructed from a previous reference picture frame using a motion vector and a prediction error. The reference picture frame is typically a previous frame that has been compressed using an intra-frame coding technique. With bidirectional schemes, the predicted frame is constructed from the best matching of either a previous or a future picture frame using either forward or backward motion vectors and a prediction error.

Sub-pixel accuracy is a key performance issue with motion vectoring is. Sub-pixel accuracy is generally defined as the lighting of pixels having a designated point that lies inside a given polygon. For example, if the pixel center is the designated point, then any pixel with its center inside the polygon will be lit. Otherwise the pixel is not lit. The location of the designated point is arbitrary. If the designated point is shifted from the center to the lower left point of each pixel, then the display of the polygon will be shifted by the distance of approximately 0.5 pixels in the lower left direction.

Interpolating frames with just pixel resolution vectors does not provide very good resolution detail. To improve resolution, the interpolation of sub-pixel vectors has been performed to avoid a loss of detail. One known technique for determining sub-pixel resolution vectors is to generate a sub-pixel resolution image for both the current and previous frame images and then search and locate the best vector in the sub-pixel resolution image. This approach, however, provides a limited increase in resolution given the significant cost in generating and storing the sub-pixel resolution frame information.

An apparatus and method for generating refined sub-pixel vectors for motion estimation from vector correlation values and converged vector correlation values using quadratic approximations is therefore needed.

SUMMARY OF INVENTION

To achieve the foregoing, and in accordance with the purpose of the present invention, an apparatus and method for generating refined sub-pixel vectors for motion estimation from vector correlation values and converged vector correlation values using quadratic approximations respectively is disclosed. The apparatus and method includes defining a minimum vector position value of a converged vector and then determining a predetermined number of vector correlation samples around the minimum vector position value. The predetermined number of vector correlation samples provide a coarse correlation surface estimation of the minimum vector position value. A correlation surface fitting of the predetermined number of vector correlation samples using a quadratic approximation of the coarse correlation surface estimation of the minimum value is then performed. The correlation surface fitting resulting in a refined sub-pixel minimum vector position with horizontal and vertical components.

BRIEF DESCRIPTION OF THE DRAWINGS

The invention, together with further advantages thereof, may best be understood by reference to the following description taken in conjunction with the accompanying drawings in which.

In the figures, like reference numbers refer to like components and elements.

DETAILED DESCRIPTION OF THE INVENTION

Figure 1:
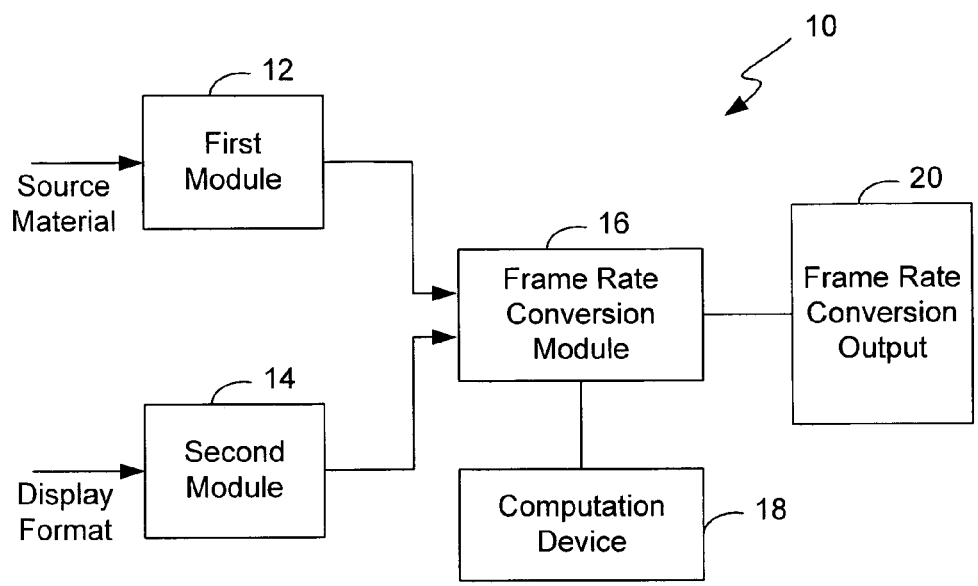
FIG. 1 is a block diagram of a frame rate conversion system according to the present invention.

Referring to FIG. 1, a block diagram of a frame rate conversion system according to the present invention is shown. The frame rate conversion system 10 includes a first module 12 configured to ascertain the frame rate of a source of material and a second module 14 that ascertains the display rate of the display. The frame rate conversion system 10 also includes a frame rate conversion module 16 that is responsible for performing a frame rate conversion of the source material to the frame rate required or preferred by the display device. A computation device 18, coupled to the frame rate conversion device 16, is used to generate refined vertical and horizontal sub-pixel vectors for motion estimation from vertical and horizontal vector correlation values and vertical and horizontal converged vector correlation values using quadratic approximations respectively. According to various embodiments of the invention, the vertical and horizontal vector correlation values and converged vector correlation values are generated using any one of a number of well known algorithms.

Figure 2:
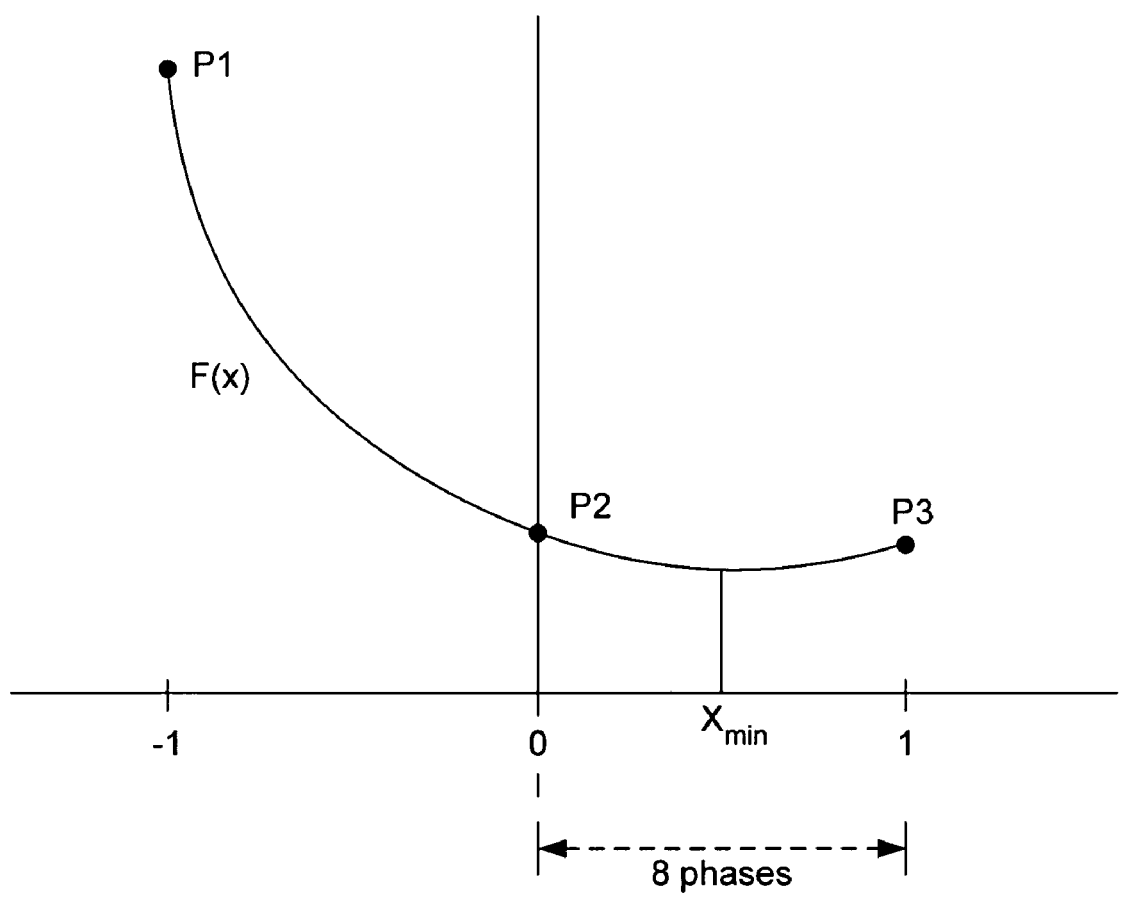
FIG. 2 is a plot illustrating three pixels locations plotted on a two dimensional graph.

Referring to FIG. 2, a plot illustrating three correlated pixels locations plotted on a two dimensional graph is shown. The plot 20 includes three pixel points labeled P1, P2 and P3. The curve between the three points P1, P2 and P3 is estimated by the quadratic equation F(x). The point of curve where the slope is zero is designated by Xmin. The refined vertical and horizontal sub-pixel vectors for motion estimation are generated from the following mathematical sequence:

The quadratic equation F(x) is defined by equation [1]:

$$X_{min}=(\frac{1}{2})[(P1-P3)/(P1-2P2+P3)] \quad [1]$$

$$X_{min}=-b/2a$$

where x=0 at the converged vector location.

The position of the minimum is where the slope disappears, that is where:

$$F'(x)=0;$$

$$F'(x)=2ax+b=0; \text{ or}$$

$$X_{min}=-b/2a$$

For the case where samples P1, P2 and P3 are integer pixels apart, the interpolation offset from the center integer minimum, in phase samples, is calculated from the following equations:

$$P1=F(-1)=a-+c \quad [2]$$

$$P2=F(0)=c \quad [3]$$

$$P3=F(1)=a+b+c. \quad [4]$$

Solving for a and b, the value of $X_{min}$ is:

$$X_{min}=(\frac{1}{2})[(P1-P3)/(P1-2P2+P3)] \quad [5]$$

For one eighth ($\frac{1}{8}^{th}$) pixel resolution, the sub pixel offset to the minimum is:

$$X_{min}=(4)[(P1-P3)/(P1-2P2+P3)] \quad [6]$$

Equation [6] can be simplified as a function of variables (P1−P2 and P3−P2). Therefore, Xmin can be represented by equation [7].

$$X_{min}=(4)[(P1-P3)-(P3-P2)/(P1-P2)+(P3-P2)] \quad [7]$$

By setting (P1−P2) to the variable "U" and (P3−P2) to the variable "V", Xmin can be represented by equation [8]:

$$X_{min}=4(U-V)/(U+V). \quad [8]$$

The function $X_{min}$ is thus represented in terms of two variables, U and V. By reducing the numerator and denominator of equation [8] to 4-bit resolution, an 8-bit address can be used in a look-up table that specifies refined minimum $X_{min}$ to ⅛ pixel resolution from the variable U and V each quantized to 4 bits.

Figure 3:
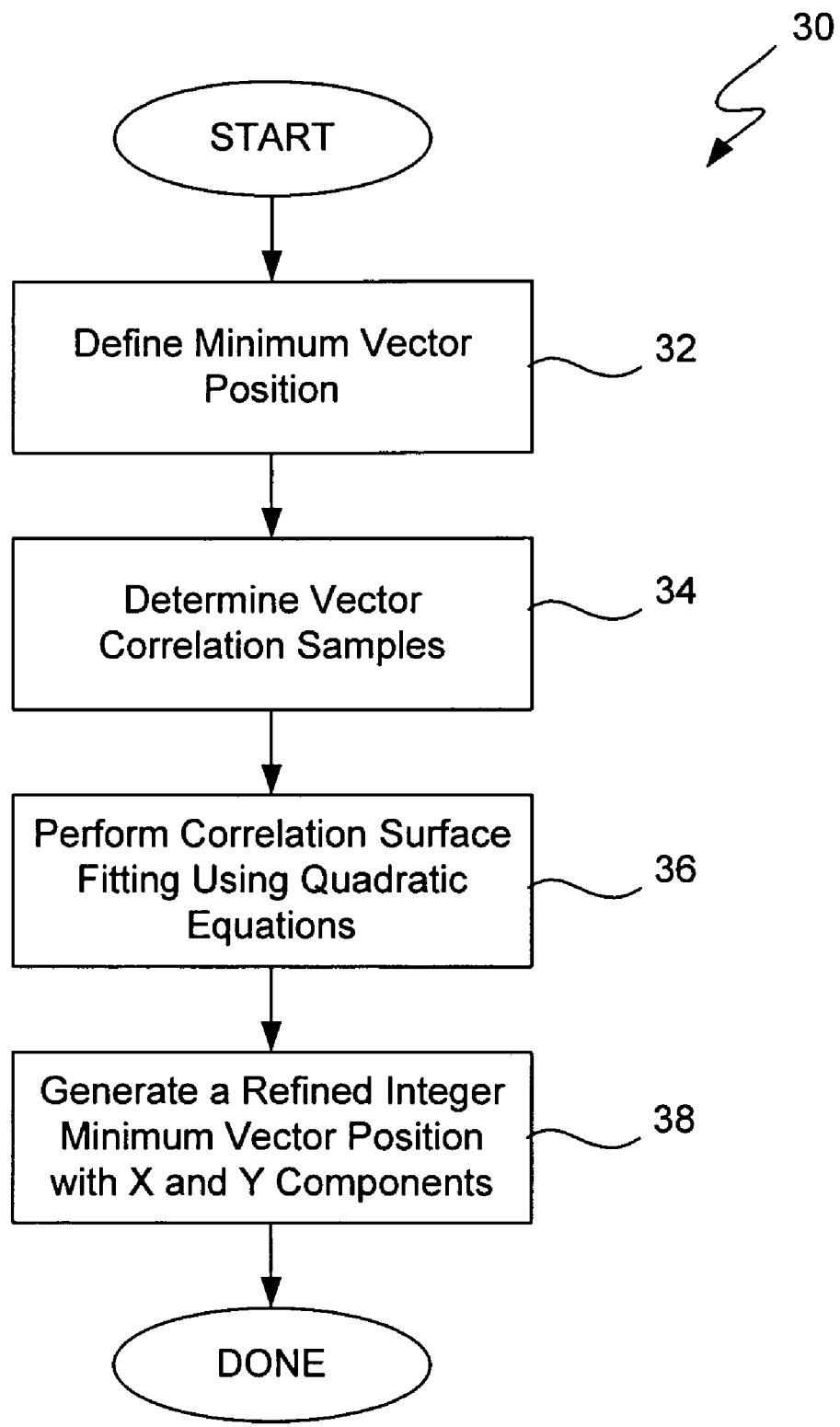
FIG. 3 is a flow diagram illustrating the sequence of the present invention.

Referring to FIG. 3, a flow diagram 30 illustrating the sequence described above is shown. The purpose of the sequence is to estimate a refined sub-pixel minimum vector position during a frame conversion. In the initial step (box 32) a minimum vector position value Xmin is defined from a converged vector. A predetermined number (e.g., 3) of vector correlation samples (P1, P2 and P3) is then taken around the minimum vector position value Xmin. (box 34). The predetermined number of vector correlation samples provide a coarse correlation surface estimation of the minimum vector position value. In the next step, a correlation surface fitting of the predetermined number of vector correlation samples using a quadratic approximation of the coarse correlation surface estimation of the minimum value is performed (box 36). When the fitting is complete, a refined sub-pixel minimum vector position is generated (box 38). The refined sub-pixel minimum vector position has both X and Y components.

Figure 4:
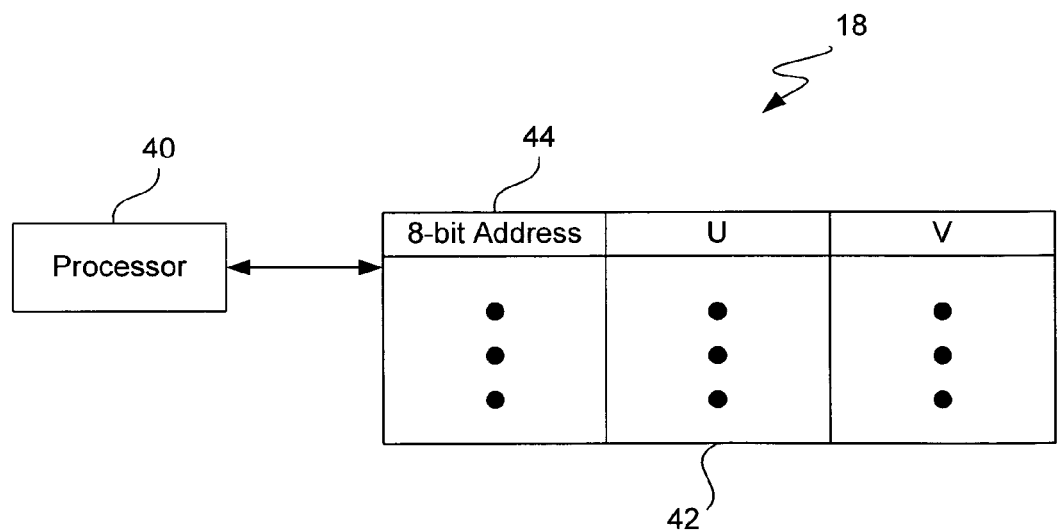
FIG. 4 is a diagram of a look up table used in the present invention.

FIG. 4 is a diagram of the computation device 18 of the frame rate conversion system 10. The computation device 18 includes a processor 40 and a look-up table 42. The processor is responsible for performing all the computations described above, namely executing equations [1] through [8]. The look up table 42 includes an 8-bit address field 44 and fields for storing different values of the variables for U and V. In one embodiment, the variables U and V are provided with 4-bit resolution. The use of a look up table and reduced resolution provides a relatively low cost, low computation solution for generating refined sub-pixel vector estimations.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method to estimate a refined sub-pixel minimum vector position during a frame conversion, the method comprising:

defining a minimum vector position value of a converged vector;

determining a predetermined number of vector correlation samples around the minimum vector position value, the predetermined number of vector correlation samples providing a coarse correlation surface estimation of the minimum vector position value; and performing a correlation surface fitting of the predetermined number of vector correlation samples using a quadratic approximation of the coarse correlation surface estimation of the minimum value, the correlation surface fitting resulting in a refined sub-pixel minimum vector position.

2. The method of claim 1, wherein the refined sub-pixel minimum vector position has a refined horizontal component.

3. The method of claim 2, further comprising ascertaining a sub-pixel horizontal refinement of the converged vector from the correlated surface fitting of the predetermined number of vector correlation samples.

4. The method of claim 1, wherein the refined sub-pixel minimum vector position has a refined vertical component.

5. The method of claim 4, further comprising ascertaining a sub-pixel vertical refinement of the converged vector from the correlated surface fitting of the predetermined number of vector correlation samples.

6. A apparatus to estimate a refined sub-pixel minimum vector position during a frame conversion, the apparatus comprising:

a computation device, the computation device configured to:

define a minimum vector position value of a converged vector;

determine a predetermined number of vector correlation samples around the minimum vector position value, the predetermined number of vector correlation samples providing a coarse correlation surface estimation of the minimum vector position value; and perform a correlation surface fitting of the predetermined number of vector correlation samples using a quadratic approximation of the coarse correlation surface estimation of the minimum value, the correlation surface fitting resulting in a refined sub-pixel minimum vector position.

7. The apparatus of claim 6, wherein the refined sub-pixel minimum vector position has a refined horizontal component.

8. The apparatus of claim 7, wherein the computation device is further configured to ascertain a sub-pixel horizontal refinement of the converged vector from the correlated surface fitting of the predetermined number of vector correlation samples.

9. The apparatus of claim 6, wherein the refined sub-pixel minimum vector position has a refined vertical component.

10. The apparatus of claim 9, wherein the computation device is further configured to ascertain a sub-pixel vertical refinement of the converged vector from the correlated surface fitting of the predetermined number of vector correlation samples.

* * * * *

UNITED STATES PATENT AND TRADEMARK OFFICE
CERTIFICATE OF CORRECTION

| | | |
|---|---|---|
| PATENT NO. | : 7,292,283 B2 | Page 1 of 1 |
| APPLICATION NO. | : 10/990451 | |
| DATED | : November 6, 2007 | |
| INVENTOR(S) | : Steve Selby | |

It is certified that error appears in the above-identified patent and that said Letters Patent is hereby corrected as shown below:

| COLUMN | LINE | ERROR |
|---|---|---|
| (57) Pg. 1, col. 2 | Abstract, Line 1 | "To achieve the foregoing, and in accordance with the purpose of the present invention," should read --In accordance with the purpose of the present invention,-- |

Signed and Sealed this

Eighth Day of December, 2009

David J. Kappos
*Director of the United States Patent and Trademark Office*